(12) United States Patent
Davis et al.

(10) Patent No.: US 11,021,983 B2
(45) Date of Patent: Jun. 1, 2021

(54) MULTI-PIECE SEAL

(71) Applicant: United Technologies Corporation, Farmington, CT (US)

(72) Inventors: Timothy M. Davis, Kennebunk, ME (US); Michael S. Stevens, Alfred, ME (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 167 days.

(21) Appl. No.: 16/008,872

(22) Filed: Jun. 14, 2018

(65) Prior Publication Data

US 2018/0291759 A1    Oct. 11, 2018

Related U.S. Application Data

(62) Division of application No. 14/830,653, filed on Aug. 19, 2015, now Pat. No. 10,113,437.

(60) Provisional application No. 62/068,502, filed on Oct. 24, 2014.

(51) Int. Cl.
```
F01D 11/00    (2006.01)
F16J 15/08    (2006.01)
F01D 25/24    (2006.01)
```

(52) U.S. Cl.
CPC .......... *F01D 11/005* (2013.01); *F01D 25/246* (2013.01); *F16J 15/0887* (2013.01); *F05D 2240/11* (2013.01); *F05D 2250/75* (2013.01); *Y02T 50/60* (2013.01)

(58) Field of Classification Search
CPC ...... F01D 11/005; F01D 11/00; F01D 11/006; F01D 11/008; F01D 25/246; F16J 15/0887; F16J 15/0893; F05D 2240/10; F05D 2250/00; F05D 2250/70; F05D 2250/71; F05D 2250/711–713; F05D 2250/72–73; F05D 2300/20–22; F05D 2300/6033; Y02T 50/672
USPC ......................................................... 277/592
See application file for complete search history.

(56) References Cited

U.S. PATENT DOCUMENTS

| | | | | |
|---|---|---|---|---|
| 3,797,836 A * | 3/1974 | Hailing | ................ | F16J 15/0887 285/367 |
| 4,759,555 A * | 7/1988 | Hailing | ...................... | F16J 9/18 277/631 |
| 4,783,085 A * | 11/1988 | Wicks | ..................... | F02K 1/805 277/345 |
| 5,014,917 A * | 5/1991 | Sirocky | .................... | B64G 1/50 239/265.11 |
| 6,203,025 B1 * | 3/2001 | Hayton | ................. | F01D 11/005 277/637 |
| 7,090,224 B2 * | 8/2006 | Iguchi | .................. | F01D 11/005 277/603 |
| 7,121,790 B2 * | 10/2006 | Fokine | ................. | F01D 11/005 415/173.7 |
| 7,347,425 B2 * | 3/2008 | James | ................. | F16J 15/0887 277/644 |
| 8,651,497 B2 * | 2/2014 | Tholen | ................. | F01D 11/005 277/644 |

(Continued)

*Primary Examiner* — Nathan Cumar
(74) *Attorney, Agent, or Firm* — Cantor Colburn LLP (57) ABSTRACT

The present disclosure relates generally to a seal between two components. The seal includes a plurality of seal sections including convolutions therein that are inter-engaged with one another to form flexible and resilient seals.

18 Claims, 10 Drawing Sheets

(56) References Cited

U.S. PATENT DOCUMENTS

| | | | |
|---|---|---|---|
| 2009/0243228 A1* | 10/2009 | Heinemann | F01D 11/005 277/595 |
| 2011/0150635 A1* | 6/2011 | Motzkus | F01D 11/005 415/170.1 |
| 2013/0113168 A1* | 5/2013 | Lutjen | F01D 11/005 277/644 |
| 2016/0115807 A1* | 4/2016 | Davis | F01D 25/246 277/592 |

* cited by examiner

MULTI-PIECE SEAL

CROSS REFERENCE TO RELATED APPLICATION

This application is a Divisional Application of U.S. Ser. No. 14/830,653 filed on Aug. 19, 2015, which claims the benefit of U.S. Ser. No. 62/068,502, filed on Oct. 24, 2014, the contents each of which are incorporated herein by reference thereto.

TECHNICAL FIELD OF THE DISCLOSURE

The present disclosure is generally related to seals and, more specifically, to a multi-piece seal.

BACKGROUND OF THE DISCLOSURE

Seals are used in many applications to prevent or limit the flow of a gas or liquid from one side of the seal to another side of the seal. For example, seals are used in many areas within a gas turbine engine to seal the gas path of the engine. The performance of gas path seals affects engine component efficiency. For example, the loss of secondary flow into the gas path of a turbine engine has a negative effect on engine fuel burn, performance/efficiency, and component life. A metal w-seal or a non-metallic rope seal are typical seals used to seal or limit secondary flow between segmented or full-hoop turbine components. However, exposure to significant relative deflections between adjacent components and/or elevated temperatures can preclude the use of these types of seals or cause them to fail prematurely. If subjected to significant deflections, a w-seal will deform and become ineffective. Using a higher strength material improves deflection capability somewhat, but generally at the expense of limiting temperature capability. Wear resistance can be a problem as well in an environment of significant relative motion. A rope seal typically has high temperature capability but has even less flexibility.

Improvements in seal design are therefore needed in the art.

SUMMARY OF THE DISCLOSURE

In one embodiment, a seal for sealing a space defined by first and second adjacent components disposed about an axial centerline is disclosed, the seal comprising: a first seal section including a first leg, a second leg, and at least one convolution between the first and second legs; a second seal section including a third leg, a fourth leg, and at least one convolution between the third and fourth legs; and a third seal section including a fifth leg, a sixth leg, and at least one convolution between the fifth and sixth legs; wherein the second leg is in contact with the third leg and the fourth leg is in contact with the fifth leg; wherein the first seal section sealingly engages with the first component and the third seal section sealingly engages with the second component.

In a further embodiment of the above, at least one compliant seal is disposed between the second seal section and the first and third seal sections.

In a further embodiment of any of the above, the compliant seal is selected from one of a woven ceramic rope seal and a braided ceramic rope seal, and ceramic textile.

In a further embodiment of any of the above, the at least one compliant seal comprises: a first compliant seal disposed between the first leg and the third leg; and a second compliant seal disposed between the fourth leg and the sixth leg.

In a further embodiment of any of the above, the at least one compliant is disposed between the second leg, the fifth leg, and the second seal section.

In a further embodiment of any of the above, the at least one compliant seal comprises a rope seal.

In a further embodiment of any of the above, the at least one compliant seal contacts the second component.

In a further embodiment of any of the above, the second seal section comprises a plurality of convolutions.

In a further embodiment of any of the above, the at least one compliant seal comprises: a first compliant seal disposed between the second leg and the second seal section; and a second compliant seal disposed between the fifth leg and the second seal section.

In a further embodiment of any of the above, the first and second compliant seals comprise rope seals.

In a further embodiment of any of the above, the at least one compliant seal comprises: a first compliant seal disposed between the second leg and the second seal section, and between the fifth leg and the second seal section, wherein the first compliant seal contacts the second component; and a second compliant seal disposed in one of the plurality of convolutions of the second seal section and in contact with the second component.

In a further embodiment of any of the above, the at least one compliant seal comprises: a first compliant seal disposed between the third leg and the first seal section; and a second compliant seal disposed between the fourth leg and the third seal section.

In a further embodiment of any of the above, the first, second and third seal sections are formed from a material selected from one of a high-temperature metal alloy, a high-temperature ceramic material, and a high-temperature ceramic composite, or a combination of two or more of a high-temperature metal alloy, a high-temperature ceramic material and a high-temperature ceramic composite.

In a further embodiment of any of the above, the first and third seal sections are formed from sheet metal comprising a thickness of approximately 0.02 inches to approximately 0.04 inches; and the second seal section is formed from sheet metal comprising a thickness of approximately 0.003 inches to approximately 0.004 inches.

In another embodiment, a seal for sealing a space defined by first and second adjacent components disposed about an axial centerline is disclosed, the seal comprising: a first seal section including a first leg, a second leg, and at least one convolution between the first and second legs; a second seal section including a third leg, a fourth leg, and at least one convolution between the third and fourth legs; and a retainer coupled to the second leg and the third leg, whereby the first and second seal sections are coupled together; wherein the first seal section sealingly engages with the first component and the second seal section sealingly engages with the second component.

In a further embodiment of any of the above, the second leg includes a first interlocking feature; the third leg includes a second interlocking feature; the retainer includes a third interlocking feature and a fourth interlocking feature; the first interlocking feature engages the third interlocking feature; and the second interlocking feature engages the fourth interlocking feature.

In a further embodiment of any of the above, a compliant seal is disposed between the second and third legs.

In a further embodiment of any of the above, the retainer comprises a plurality of clips disposed around a circumference of the second and third legs.

In a further embodiment of any of the above, a first slot is formed through the second leg and a second slot is formed through the third leg, wherein the retainer extends through the first and second slots.

In a further embodiment of any of the above, the retainer comprises the retainer comprises at least one piece of material having a first end, a second end, and a longitudinal axis extending therebetween, wherein the first and second ends are folded away from the longitudinal axis.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
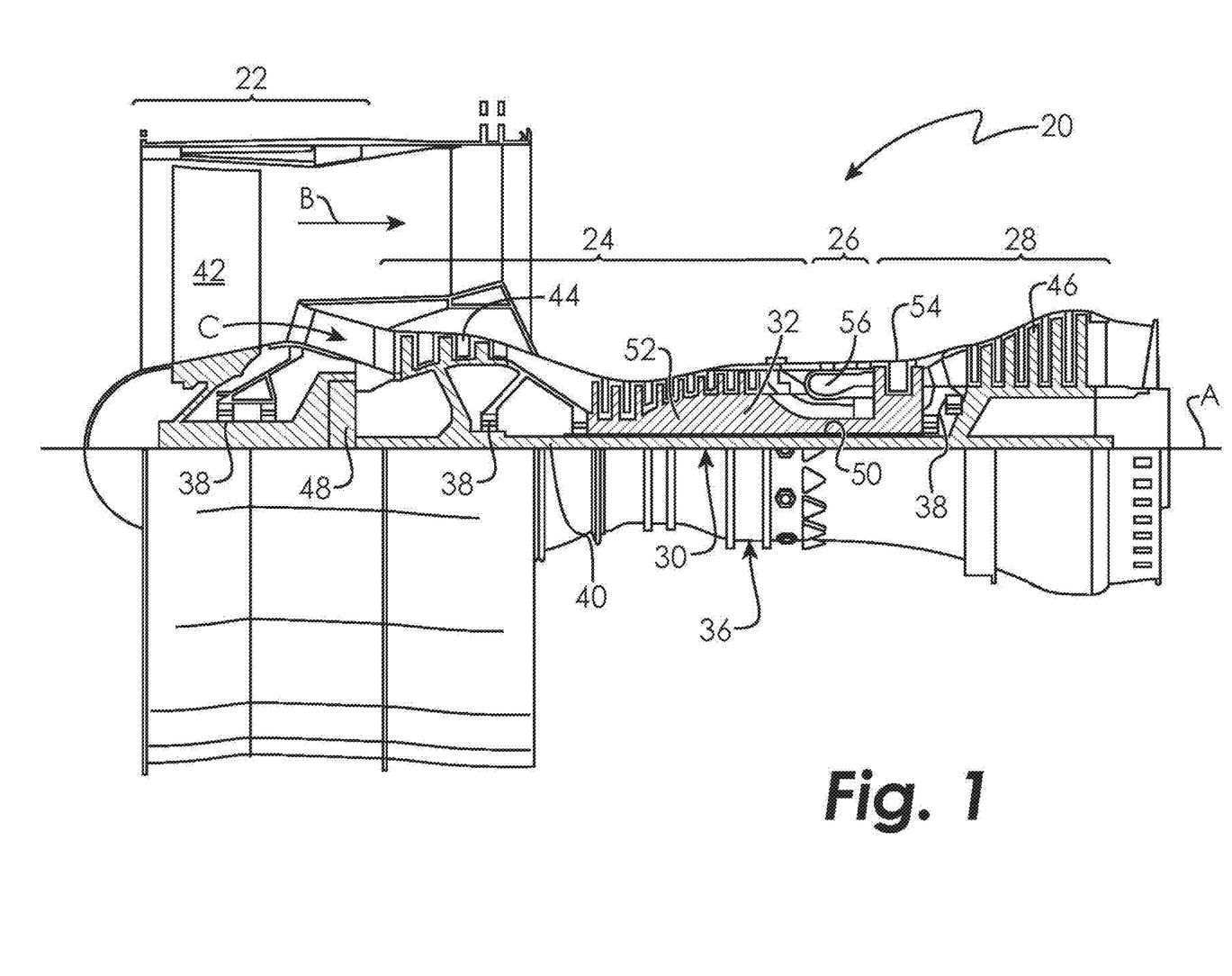
FIG. 1 is a schematic cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram.degree. R)/(518.7.degree. R)]^{0.5}$. The "Low corrected fan tip speed" as disclosed herein according to one non-limiting embodiment is less than about 1150 ft/second (350.5 m/sec).

Figure 2:
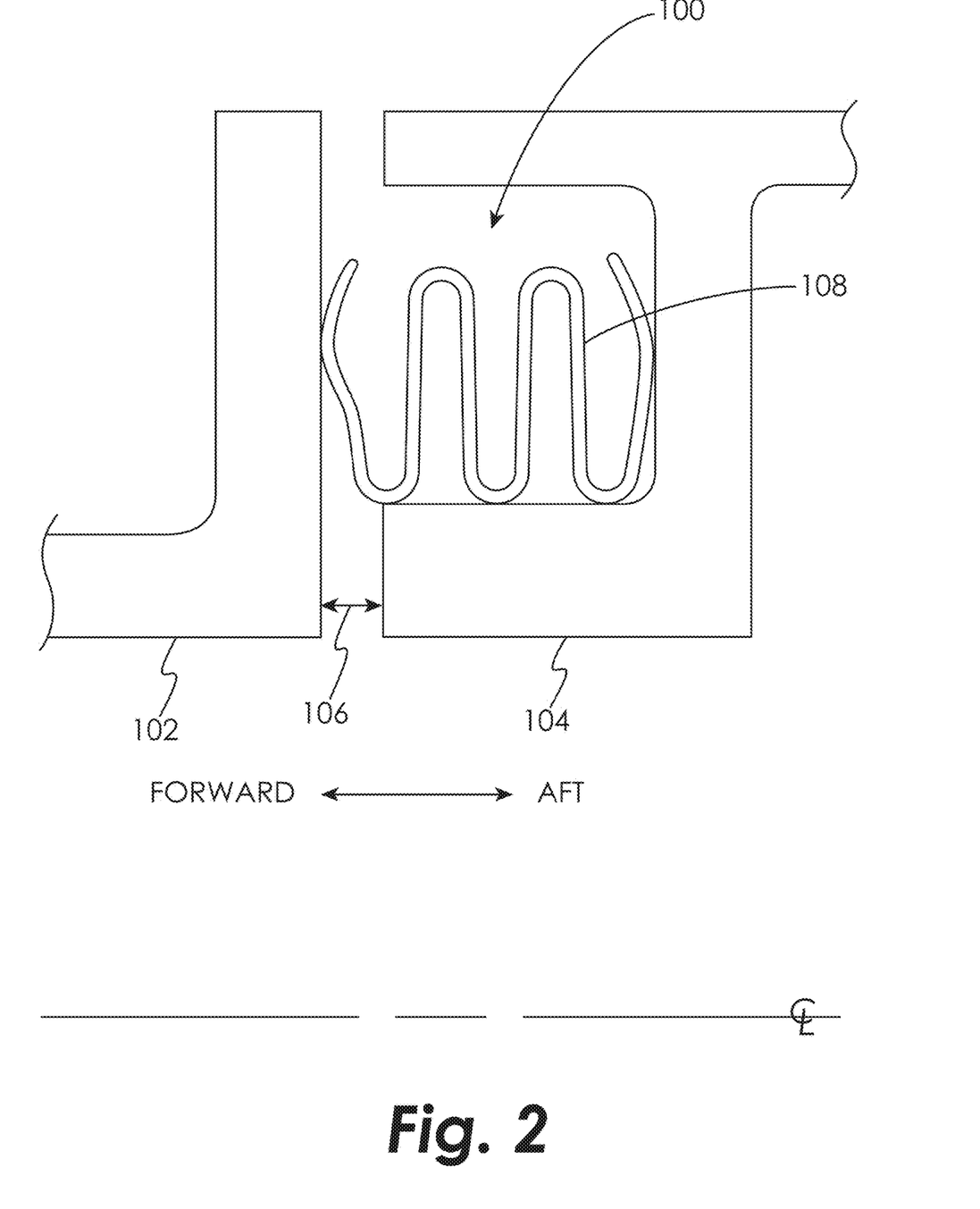
FIG. 2 is a schematic cross-sectional view of a seal and seal cavity in an embodiment.

FIG. 2 schematically illustrates a cross-sectional view of a seal cavity 100 formed by two axially-adjacent segmented or full-hoop circumferential turbine components 102 and 104 which may move axially, radially, and/or circumferentially relative to one another about an axial centerline of the turbine engine. It will be appreciated that although turbine components are used to demonstrate the positioning and functioning of the seals disclosed herein, this is done by way of illustration only and the seals disclosed herein may be used in other applications. A nominal design clearance 106 exists between the components 102 and 104. Within the seal cavity 100 lies an annular w-seal 108 formed from a material appropriate to the anticipated operating conditions (e.g., deflection, temperature, pressure, etc.) of the w-seal 108, such a nickel-based alloy to name just one non-limiting example. A typical w-seal 108 is formed from sheet metal of thickness in the range of approximately 0.006 inch (0.152 mm) to approximately 0.010 inch (0.254 mm).

The design and material used in the construction of the w-seal 108 causes it to be deflected both forward and aft within the cavity 100, thereby causing it to seat against the components 102 and 104, even when the components 102 and 104 move relative to each other causing the clearance 106 to change. However, if subjected to significant deflections and/or temperature, a w-seal 108 may deform, causing it to become ineffective and potentially liberate.

Figure 3:
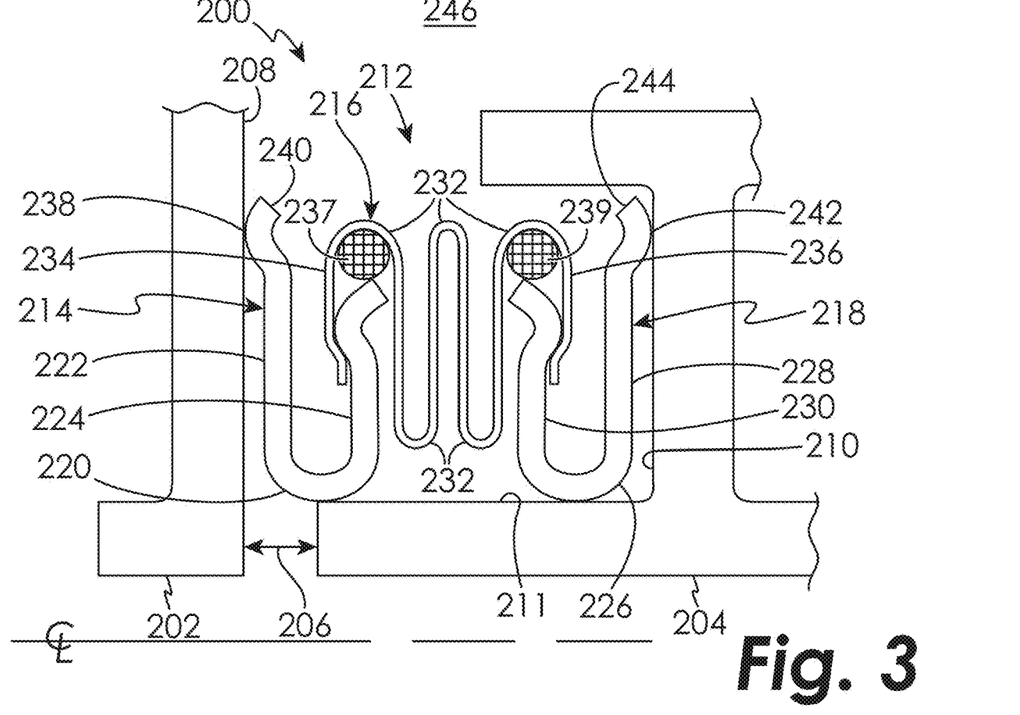
FIG. 3 is a schematic cross-sectional view of a seal and seal cavity in an embodiment.

FIG. 3 schematically illustrates a cross-sectional view of a seal cavity 200 formed by two axially-adjacent segmented or full hoop turbine components 202 and 204 which may move axially, radially, and circumferentially relative to one another about an axial centerline of the turbine engine. A nominal design clearance 206 exists between the components 202 and 204. Component 202 includes a surface 208 facing the seal cavity 200 and component 204 includes surfaces 210 and 211 facing the seal cavity 200. Within the seal cavity 200 lies a seal 212 formed from a material appropriate to the anticipated operating conditions of the seal 212, such as a high-temperature metal alloy, a high temperature ceramic material, a high temperature ceramic composite, or a combination of two or more of these, to name just a few non-limiting examples.

The seal 212 is formed from a first seal section 214, a second seal section 216, and a third seal section 218. The first seal section 214 and the third seal section 218 comprise full hoop or split hoop components including at least one convolution formed therein. In the illustrated embodiment, the first seal section 214 includes a single convolution 220 terminating in legs 222 and 224. Similarly, the third seal section 218 includes a single convolution 226 terminating in legs 228 and 230. The second seal section 216 comprises a full hoop or split hoop component including multiple convolutions therein. In the illustrated embodiment, the second seal section 216 comprises multiple convolutions 232 terminating in legs 234 and 236. The legs 224 and 234 each include interlocking features, such as a protrusion and a slot to name just one non-limiting example. Similarly, the legs 230 and 236 each include interlocking features, such as a protrusion and a slot to name just one non-limiting example. A rope seal 237 is disposed between the leg 224 and the second seal section 216, and a rope seal 239 is disposed between the leg 230 and the second seal section 216, thereby maintaining the relative position of, and sealing contact with, the second seal section 216 with respect to the third seal section 218. The second seal section 216 therefore rests upon the rope seals 237, 239, which in turn rest upon the first seal section 214 and the third seal section 218, while the first seal section 214 and the third seal section 218 each rest upon the surface 211 of the component 204. The seal sections 214, 216, 218 are free to rotate or hinge with respect to one another, increasing flexibility of the seal 212 relative to a one piece seal such as seal 108. The rope seals 237, 239 may be solid or hollow in various embodiments to achieve a desired resilience, may be formed from a material appropriate to the anticipated operating conditions of the rope seals 237, 239, such as a high-temperature ceramic fiber material, a high-temperature metal alloy, or a combination of the two to name just a few non-limiting examples.

In an embodiment, the first seal section 214 and the third seal section 218 are formed from relatively thick material to improve wear tolerance and strength capability, a lower-strength but higher-temperature capable material to improve thermal tolerance, and/or a lower-strength but higher-lubricity material to improve wear resistance. In an embodiment, the first seal section 214 and the third seal section 218 are formed from sheet metal with a thickness in the range of approximately 0.02 inch (0.51 mm) to approximately 0.04 inch (1.02 mm), to name just one non-limiting example. In an embodiment, the second seal section 216 is formed from relatively thin and lower-temperature but Higher-strength material to improve flexibility and resilience. In an embodiment, the second seal section 216 is formed from sheet metal with a thickness in the range of approximately 0.003 inch (0.076 mm) to approximately 0.004 inch (0.102 mm), to name just one non-limiting example.

The first seal section 214 may include a protrusion 238 in contact with the surface 208 at or near an end 240 of leg 222 such that the first seal section 214 contacts the surface 208 along a single substantially circumferential line of contact. As used herein, the phrase "substantially circumferential line of contact" means lines that are circumferential but may include discontinuities therein, and also includes lines with a nominal radial or axial thickness. The third seal section 218 may also include protrusion 242 in contact with the surface 210 at or near an end 244 of leg 228 such that the third seal section 218 contacts the surface 210 along a single substantially circumferential line of contact. The contact surfaces defined by the protrusions 238, 242 are located at or near the ends 240, 244 to maximize resilience as well as to maximize the pressure load applied to these contact surfaces. The first seal section 214 contacts the surface 211 of component 204 along a single substantially circumferential line of contact at the convolution 220 and the third seal section 218 contacts the surface 211 of component 204 along a single substantially circumferential line of contact at the convolution 226. The seal 212 may include a coating and/or a sheath to provide increased wear resistance.

Pressure in a secondary flow cavity 246 is transmitted to the seal cavity 200 through an opening defined by the components 202, 204. This pressure acts upon the surfaces of the seal sections 214, 216, 218, thereby causing the outside diameter of the first seal section 214 to seat against the surface 208 of the component 202 and the outside diameter of the third seal section 218 to seat against the surface 210 of the component 204. This prevents most or all of the secondary flow cavity 246 gases from reaching the design clearance 206 area and flow path. As the two components 202 and 204 move relative to each other in the axial and/or radial direction due to thermal and/or mechanical-driven displacements of the components 202, 204, the seal sections 214, 216, 218 are free to flex like the w-seal 108 while the pressure forces acting upon the surfaces of the seal sections 214, 216, 218 load the seal 212 so that it remains in contact with both components 202 and 204 as shown. Therefore, sealing is maintained while the components 202 and 204 and the components of the seal 212 move relative to one another. Unlike the w-seal 108, however, the second seal section 216 is more flexible/resilient than the outer legs of the w-seal 108 because the second seal section is formed from relatively thin material. In an embodiment, the seal 212 may be sized to be lightly compressed in the cold condition to prevent damage during transportation and to ensure that the seal 212 is immediately energized by the delta pressure at engine start up.

Figure 4:
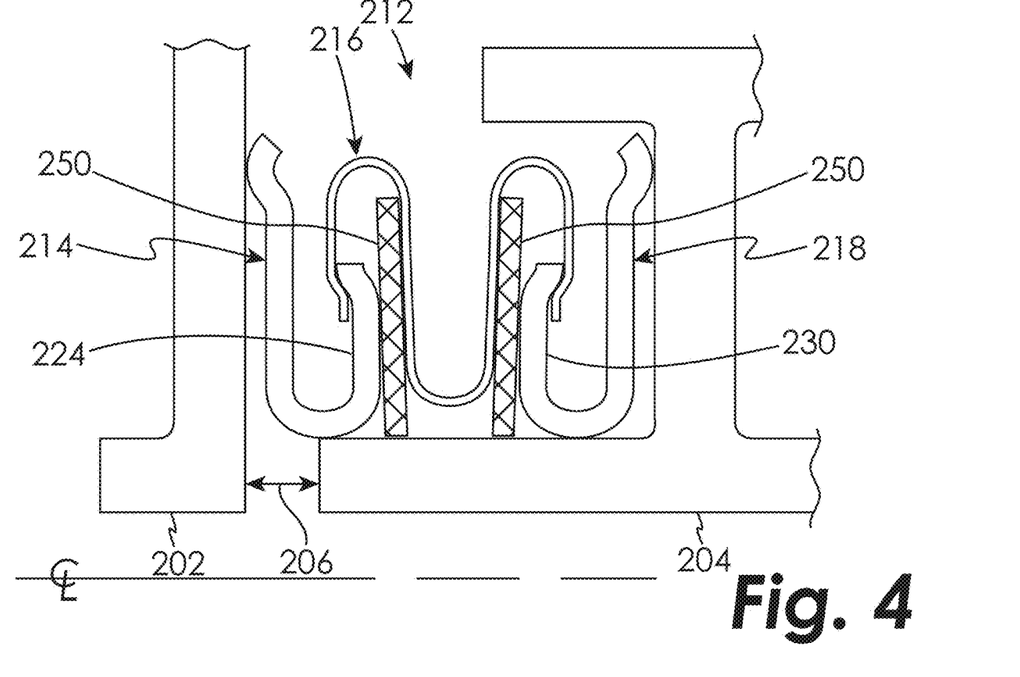
FIG. 4 is a schematic cross-sectional view of a seal and seal cavity in an embodiment.

In the embodiment of FIG. 4, the seal 212 may include a full hoop or split hoop high-temperature and compliant seal 250, such as a woven or braided ceramic rope seal or flat fabric (for example, NEXTEL ceramic textile available from The 3M Company of Maplewood, Minn. USA, to name just one non-limiting example), at an interface between the leg 224 of the first seal section 214 and the second seal section 216, as well as at an interface between the leg 230 of the third seal section 218 and the second seal section 216. The compliant seals 250 enhance the contact between the seal sections and provide additional sealing. The compliant seals 250 may be mechanically attached to the seal sections 214, 216, and/or 218.

Figure 5:
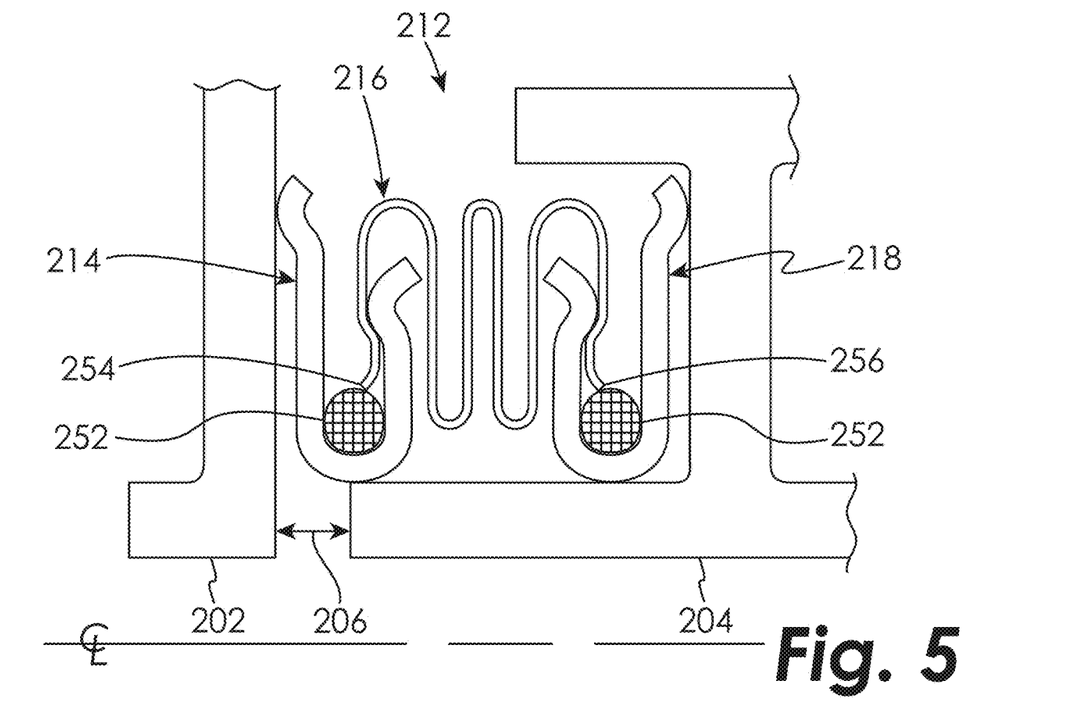
FIG. 5 is a schematic cross-sectional view of a seal and seal cavity in an embodiment.

With reference to FIG. 5, the seal 212 may include a full hoop or split hoop rope seal 252, which may be solid or hollow in various embodiments to achieve a desired resilience, may be formed from a material appropriate to the anticipated operating conditions of the rope seal 252, such as a high-temperature ceramic fiber material, a high-temperature metal alloy, or a combination of the two to name just a few non-limiting examples. The rope seal 252 may be disposed at an interface between the end 254 of the second seal section 216 and the first seal section 214, as well as at an interface between the end 256 of the second seal section 216 and the third seal section 218. The rope seals 252 enhance the radial positioning between the seal sections and provide additional sealing. The rope seals 252 may be mechanically attached to the seal sections 214, 216, and/or 218.

Figure 6:
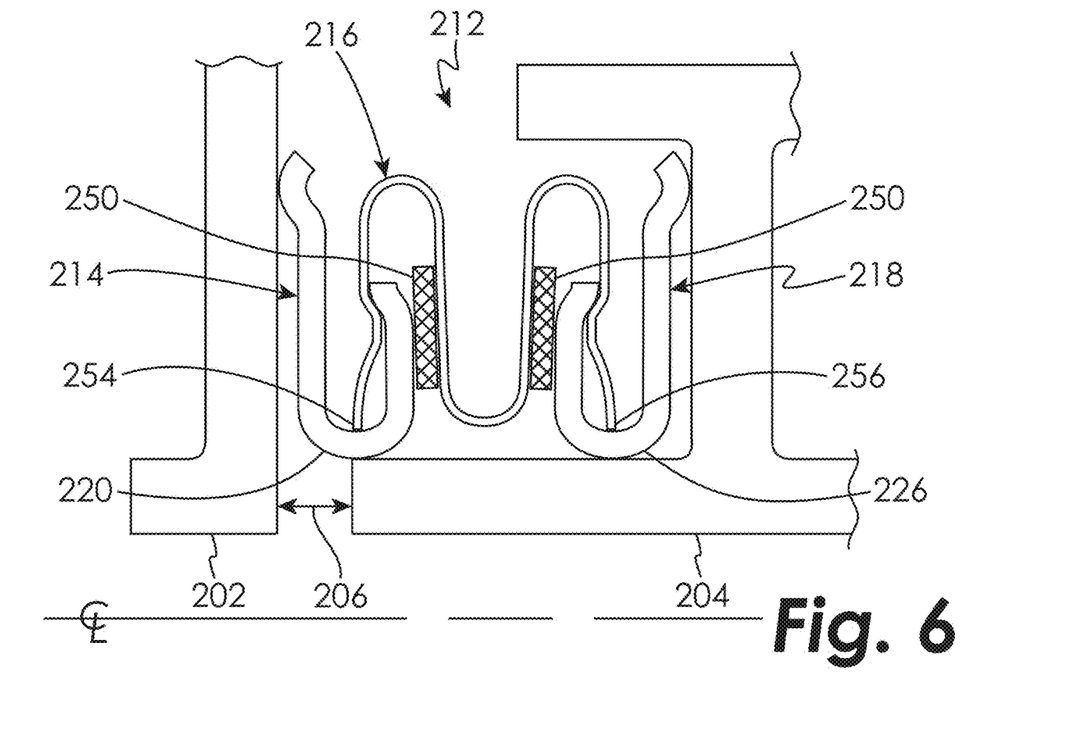
FIG. 6 is a schematic cross-sectional view of a seal and seal cavity in an embodiment.

In the embodiment of FIG. 6, the seal is substantially identical to the seal 212 shown in FIG. 4, except that the end 254 of the second seal section is extended to rest upon the convolution 220 of the first seal section 214, and the end 256 of the second seal section is extended to rest upon the convolution 226 of the third seal section 218. The extensions of the ends 254, 256 enhance the radial positioning between the seal sections.

Figure 7:
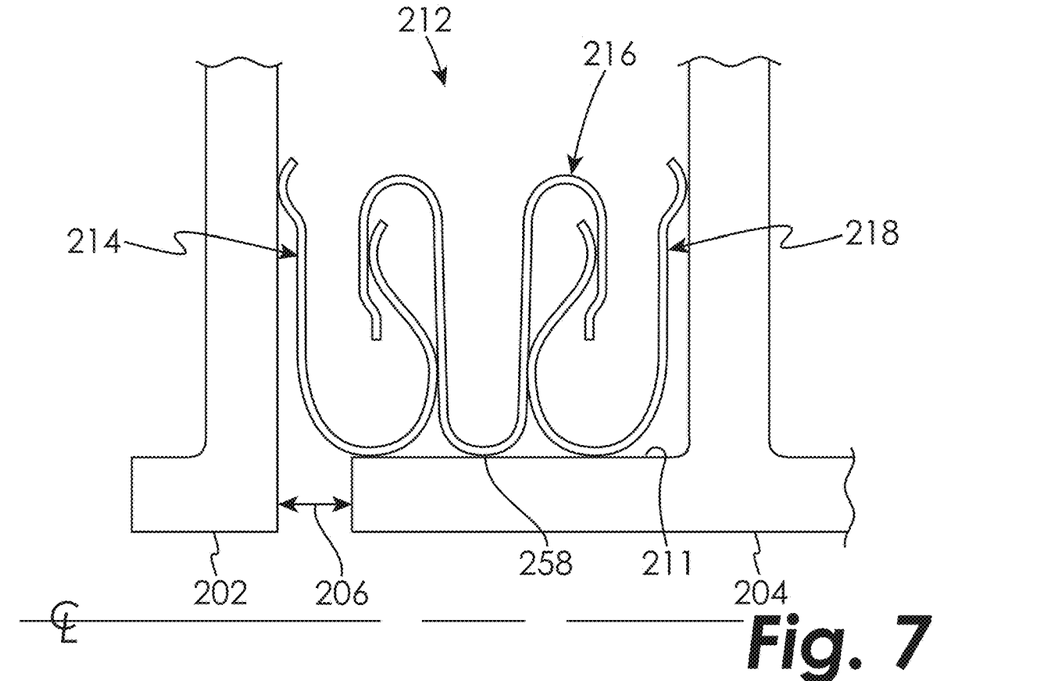
FIG. 7 is a schematic cross-sectional view of a seal and seal cavity in an embodiment.

In the embodiment of FIG. 7, the second seal section includes a convolution 258 that is in contact with the surface 211 of the component 204. The convolution 258 enhances the radial positioning between the seal sections. The seal sections 214, 216, 218 are formed from material having substantially the same thickness in an embodiment.

Figure 8:
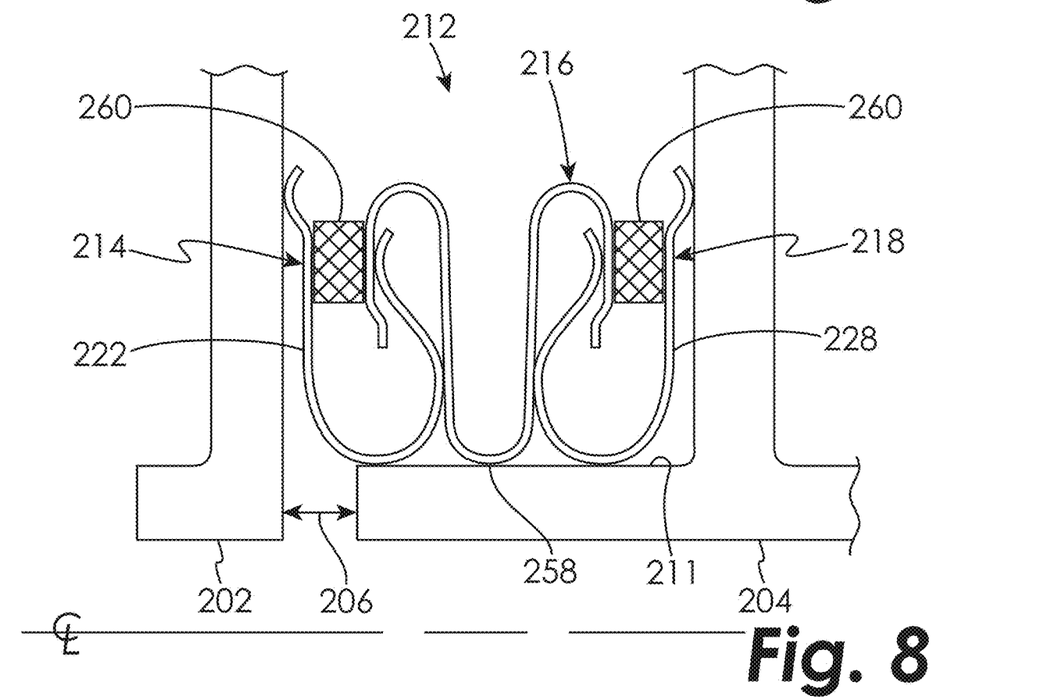
FIG. 8 is a schematic cross-sectional view of a seal and seal cavity in an embodiment.

In the embodiment of FIG. 8, the seal is substantially identical to the seal 212 shown in FIG. 7, except that the seal 212 may include a full hoop or split hoop high-temperature and compliant seal 260, such as a woven or braided ceramic rope seal or flat fabric (for example, NEXTEL ceramic textile available from The 3M Company of Maplewood, Minn. USA, to name just one non-limiting example), at an interface between the leg 222 of the first seal section 214 and the second seal section 216, as well as at an interface between the leg 228 of the third seal section 218 and the second seal section 216. The compliant seals 260 enhance the contact between the seal sections and provide additional sealing. The compliant seals 260 may be mechanically attached to the seal sections 214, 216, and/or 218. The seal sections 214, 216, 218 are formed from material having substantially the same thickness in an embodiment.

Figure 9:
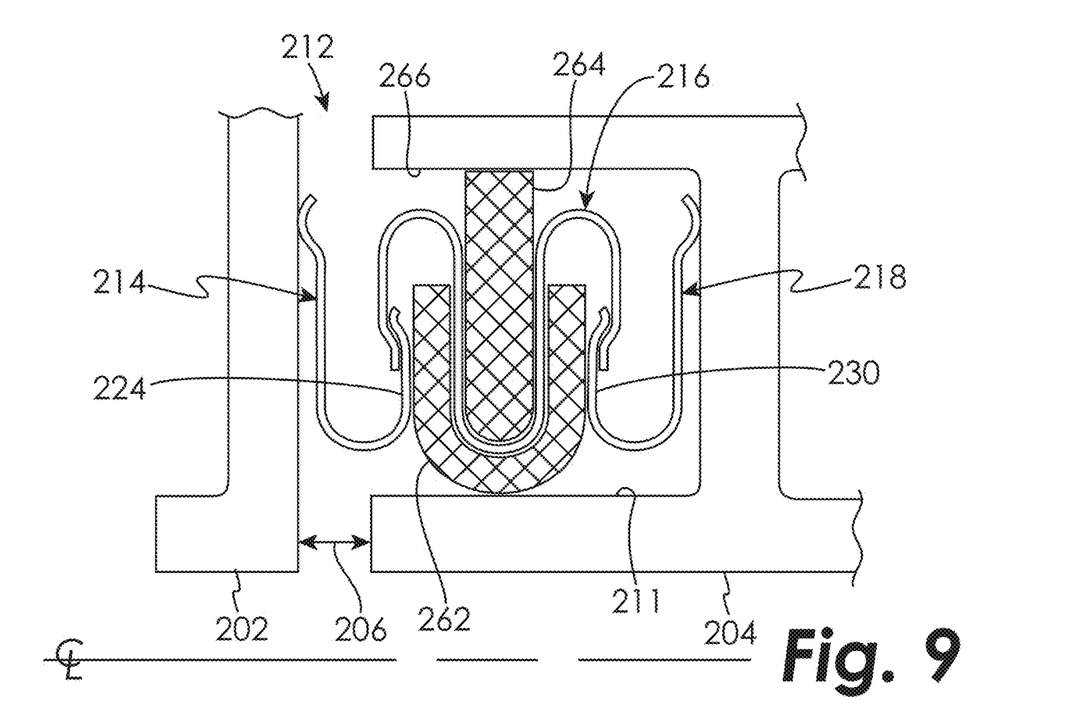
FIG. 9 is a schematic cross-sectional view of a seal and seal cavity in an embodiment.

In the embodiment of FIG. 9, none of the seal sections 214, 216, 218 are in contact with the surface 211 of the component 204. Instead, a full hoop or split hoop high-temperature and compliant seal 262, such as a woven or braided ceramic rope seal or flat fabric (for example, NEXTEL ceramic textile available from The 3M Company of Maplewood, Minn. USA, to name just one non-limiting example), may be disposed at an interface between the leg 224 of the first seal section 214 and the second seal section 216, as well as at an interface between the leg 230 of the third seal section 218 and the second seal section 216. The compliant seal 262 also contacts the surface 211 of the component 204. A second compliant seal 264 may be disposed between adjacent convolutions of the second seal section 216, as well as between the second seal section and the surface 266 of the component 204. The compliant seals 262, 264 enhance radial positioning of the seal 212, enhance the contact between the seal sections, provide additional sealing, and provide thermal and/or wear shielding. The compliant seals 262, 264 may be mechanically attached to the seal sections 214, 216, and/or 218. The seal sections 214, 216, 218 are formed from material having substantially the same thickness in an embodiment.

Figure 10:
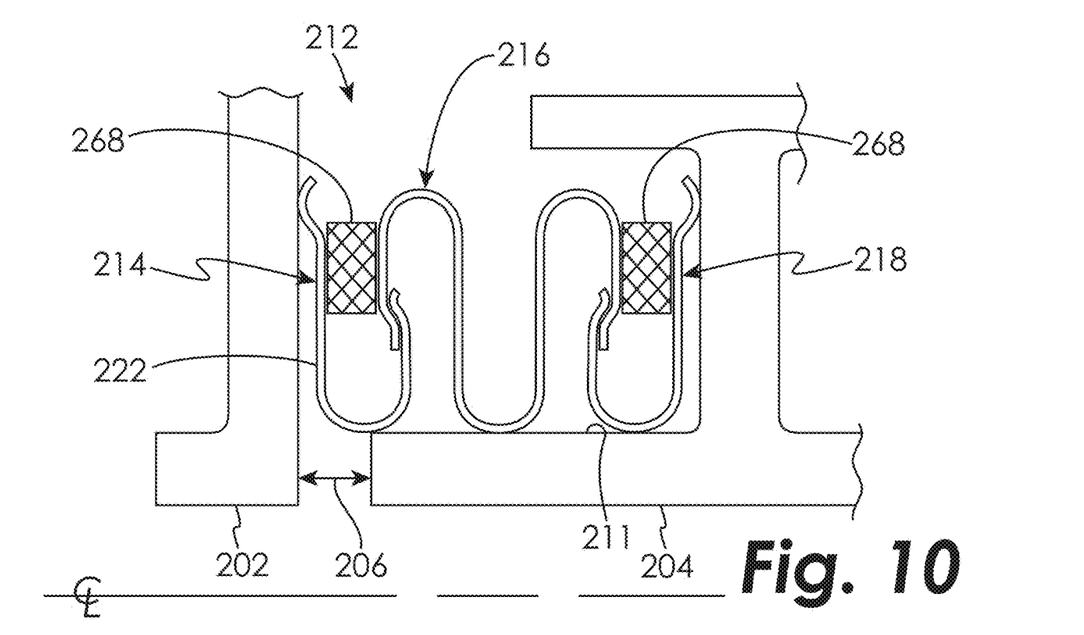
FIG. 10 is a schematic cross-sectional view of a seal and seal cavity in an embodiment.

In the embodiment of FIG. 10, the seal 212 is substantially identical to the seal 212 shown in FIG. 9, except that instead of the compliant seals 262, 264, the seal 212 may include a full hoop or split hoop high-temperature and compliant seal 268, such as a woven or braided ceramic rope seal or flat fabric (for example, NEXTEL ceramic textile available from The 3M Company of Maplewood, Minn. USA, to name just one non-limiting example), at an interface between the leg 222 of the first seal section 214 and the second seal section 216, as well as at an interface between the leg 228 of the third seal section 218 and the second seal section 216. The compliant seals 268 enhance the contact between the seal sections and provide additional sealing. The compliant seals 268 may be mechanically attached to the seal sections 214, 216, and/or 218. The seal sections 214, 216, 218 are formed from material having substantially the same thickness in an embodiment.

Figure 11:
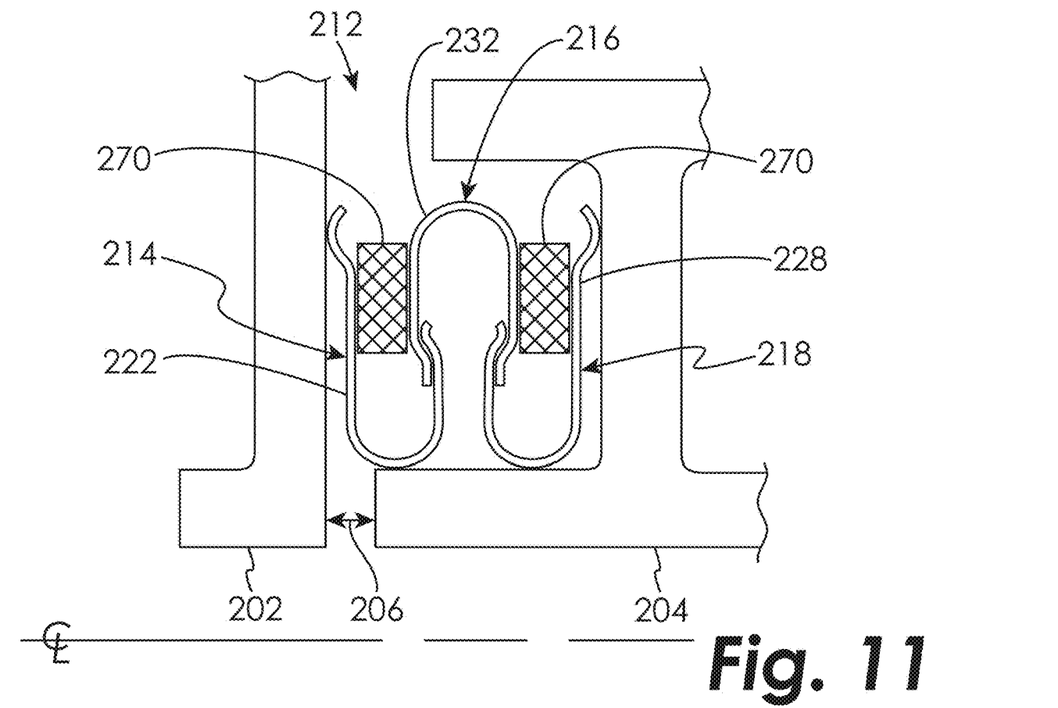
FIG. 11 is a schematic cross-sectional view of a seal and seal cavity in an embodiment.

In the embodiment of FIG. 11, the second seal section 216 includes only a single convolution 232. The seal 212 may include a full hoop or split hoop high-temperature and compliant seal 270, such as a woven or braided ceramic rope seal or flat fabric (for example, NEXTEL ceramic textile available from The 3M Company of Maplewood, Minn. USA, to name just one non-limiting example), at an interface between the leg 222 of the first seal section 214 and the second seal section 216, as well as at an interface between the leg 228 of the third seal section 218 and the second seal section 216. The compliant seals 270 enhance the contact between the seal sections and provide additional sealing. The compliant seals 270 may be mechanically attached to the seal sections 214, 216, and/or 218. The seal sections 214, 216, 218 are formed from material having substantially the same thickness in an embodiment.

Figure 12:
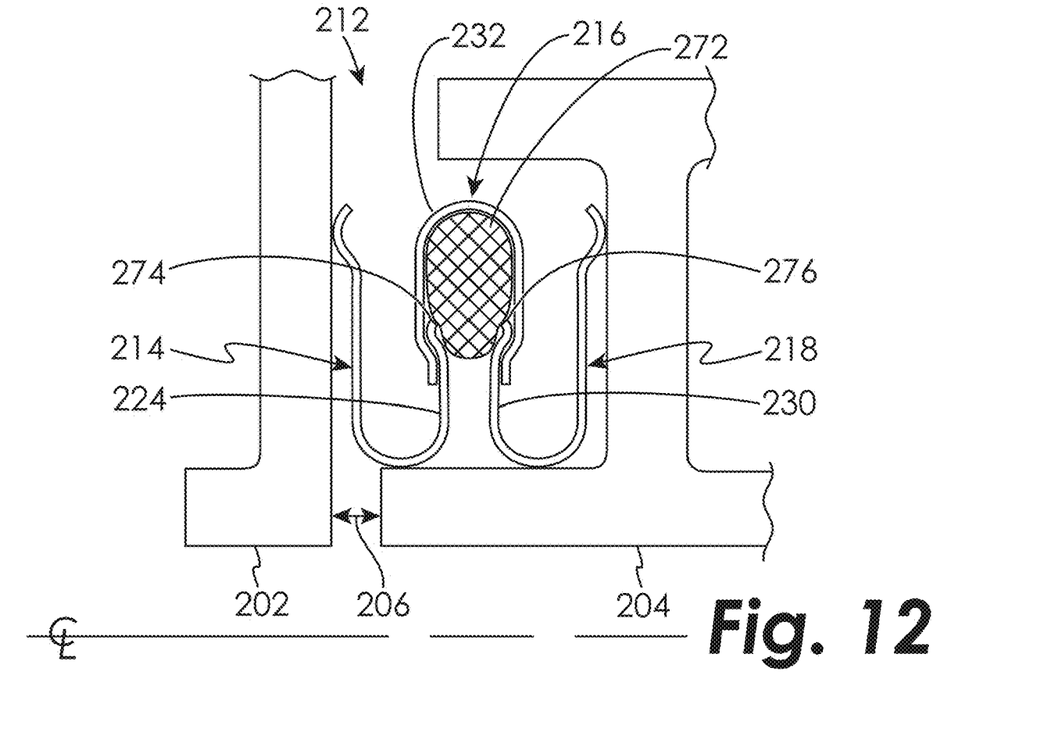
FIG. 12 is a schematic cross-sectional view of a seal and seal cavity in an embodiment.

In the embodiment of FIG. 12, the second seal section 216 includes only a single convolution 232. The seal 212 may include a full hoop or split hoop rope seal 272, which may be solid or hollow in various embodiments to achieve a desired resilience, may be formed from a material appropriate to the anticipated operating conditions of the rope seal 272, such as a high-temperature ceramic fiber material, a high-temperature metal alloy, or a combination of the two to name just a few non-limiting examples. The rope seal 272 may be disposed within the convolution 232 of the second seal section 216 so that it is in contact with end 274 of the leg 224 of the first seal section 214 and the end 276 of the leg 230 of the third seal section 218. The rope seal 272 enhances the radial positioning between the seal sections and provides additional sealing. The rope seal 272 may be mechanically attached to the seal sections 214, 216, and/or 218. The seal sections 214, 216, 218 are formed from material having substantially the same thickness in an embodiment.

Figure 13:
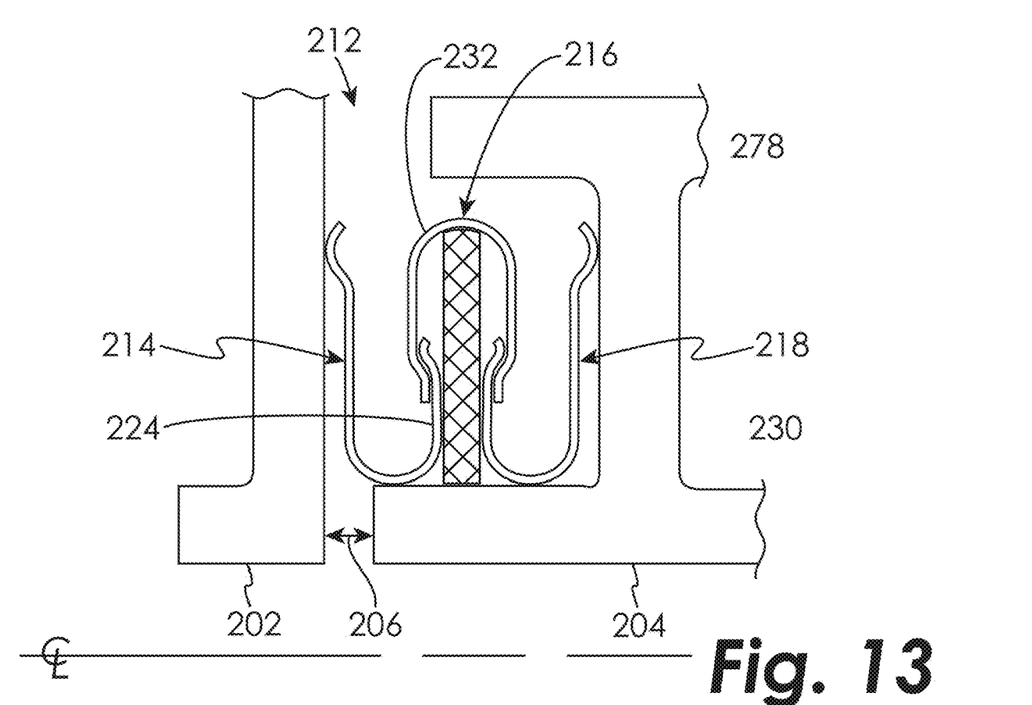
FIG. 13 is a schematic cross-sectional view of a seal and seal cavity in an embodiment.

In the embodiment of FIG. 13, the second seal section 216 includes only a single convolution 232. The seal 212 may include a full hoop or split hoop high-temperature and compliant seal 278, such as a woven or braided ceramic rope seal or flat fabric (for example, NEXTEL ceramic textile available from The 3M Company of Maplewood, Minn. USA, to name just one non-limiting example), at an interface between the leg 224 of the first seal section 214 and the leg 230 of the third seal section 218. The compliant seal 278 is also in contact with the surface 211 of the component 204. The compliant seal 278 enhances the contact between the seal sections and provides additional sealing. and the compliant seal 278 also provides thermal and/or wear shielding at the radially inner diameter of the seal 212. The compliant seal 278 may be mechanically attached to the seal sections 214, 216, and/or 218. The seal sections 214, 216, 218 are formed from material having substantially the same thickness in an embodiment.

Figure 14:
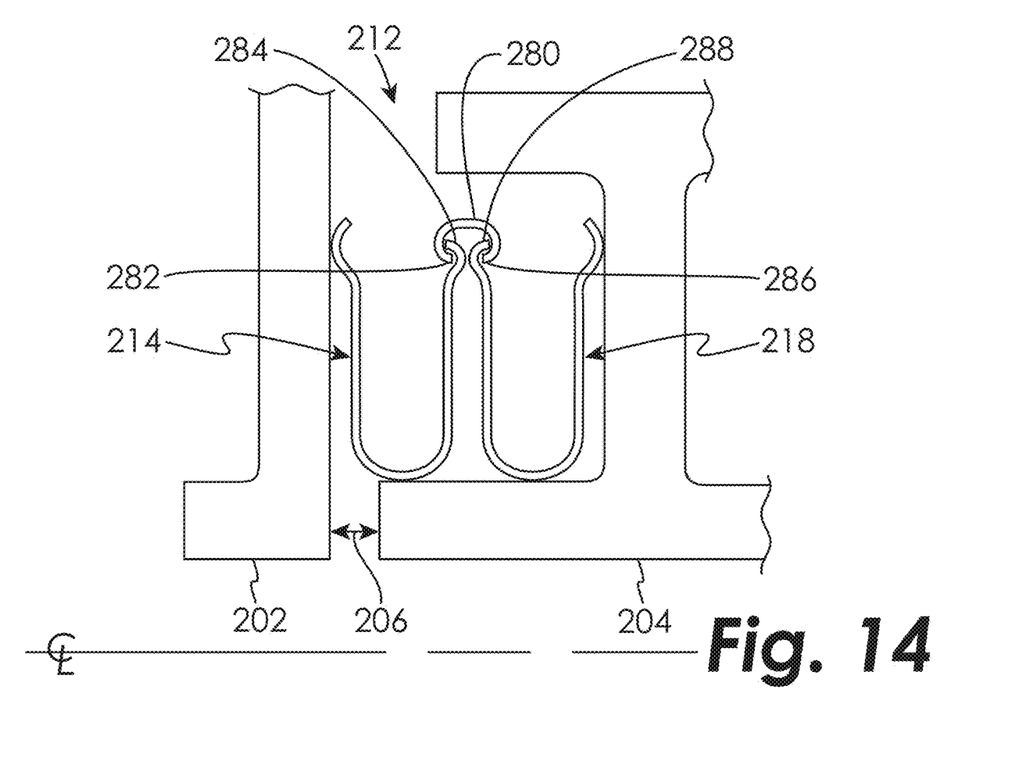
FIG. 14 is a schematic cross-sectional view of a seal and seal cavity in an embodiment.

As shown in the embodiment of FIG. 14, multiple seal sections may be positioned side-by-side in series to achieve additional resilience. In the illustrated embodiment, seal 212 comprises first seal section 214 positioned adjacent third seal section 218 with no seal section 216 coupling them together. The seal sections 214 and 218 may be retained by a full hoop, split hoop or segmented retainer 280. The retainer 280 includes an interlocking feature 282 that engages an interlocking feature 284 on the first seal section 214, as well as an interlocking feature 286 that engages an interlocking feature 288 on the third seal section 218. The retainer 280 may be formed from a material appropriate to the operating conditions of the seal 212. Although two seal sections 214, 218 are illustrated, any number of seal sections may be placed side-by-side to create a larger seal for applications requiring additional flexibility.

Figure 15:
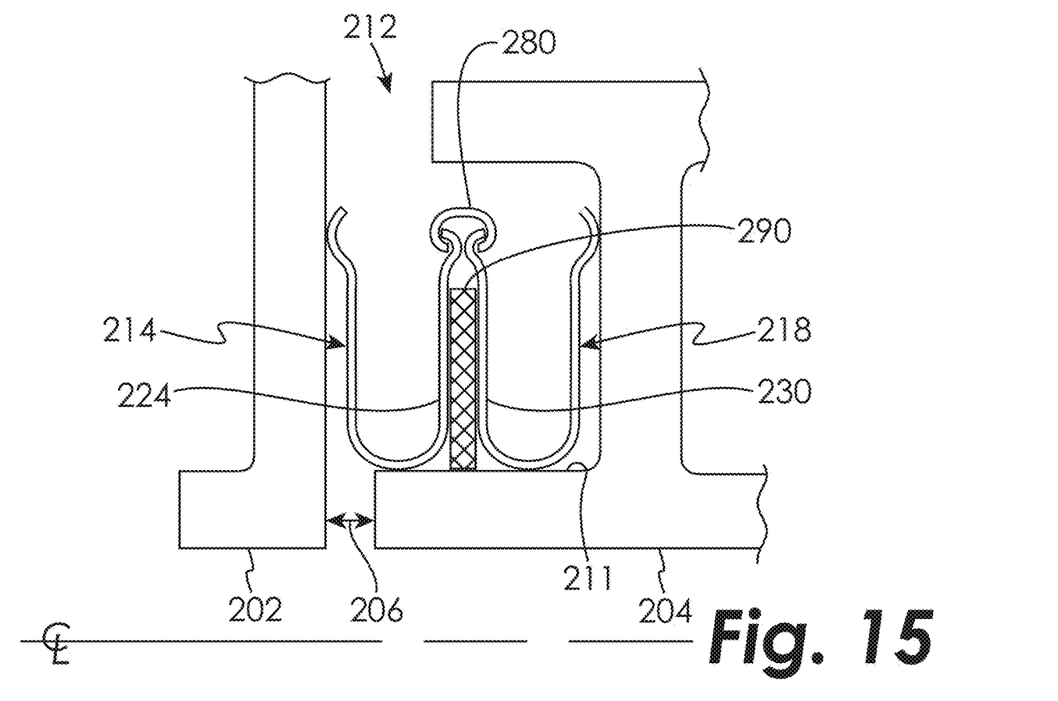
FIG. 15 is a schematic cross-sectional view of a seal and seal cavity in an embodiment.

In the embodiment of FIG. 15, the seal 212 is substantially identical to the seal 212 shown in FIG. 14, except that the seal 212 may include a full hoop or split hoop high-temperature and compliant seal 290, such as a woven or braided ceramic rope seal or flat fabric (for example, NEXTEL ceramic textile available from The 3M Company of Maplewood, Minn. USA, to name just one non-limiting example), at an interface between the leg 224 of the first seal section 214 and the leg 230 of the third seal section 218. The compliant seal 290 is further in contact with the surface 211 of the component 204. The compliant seal 290 enhances the radial positioning of the seal 212, enhances the contact between the seal sections, provides additional sealing, and provides thermal and/or wear shielding. The compliant seal 290 may be mechanically attached to the seal section 214 and/or 218. The seal sections 214, 218 are formed from material having substantially the same thickness in an embodiment. Although two seal sections 214, 218 are illustrated, any number of seal sections may be placed side-by-side to create a larger seal for applications requiring additional flexibility.

Figure 16:
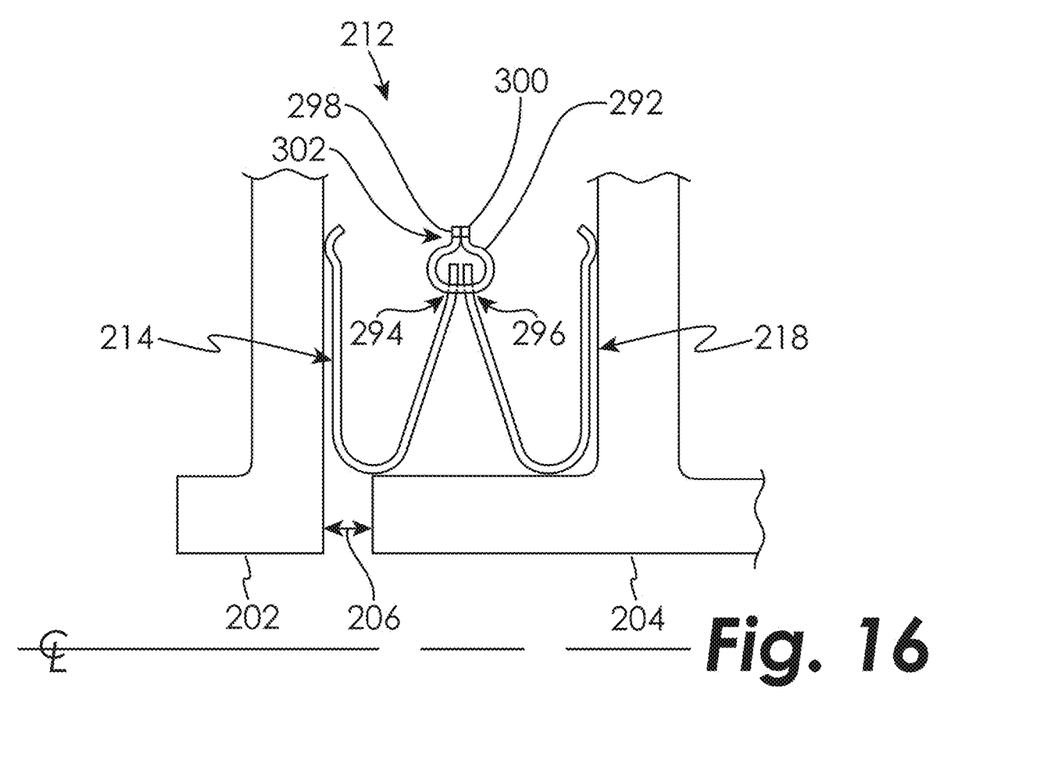
FIG. 16 is a schematic cross-sectional view of a seal and seal cavity in an embodiment.

As shown in the embodiment of FIG. 16, multiple seal sections may be positioned side-by-side in series to achieve additional resilience. In the illustrated embodiment, seal 212 comprises first seal section 214 positioned adjacent third seal section 218 with no seal section 216 coupling them together. The seal sections 214 and 218 may be retained by a plurality of clips 292 spaced around the circumference of the outer diameter of the seal 212 in an embodiment. Each clip 292 may extend through a slot 294 in the first seal section 214 and a slot 296 in the third seal section 218. In an embodiment, the clip 292 may be formed from a piece of material formed into a loop such that a first end 298 and a second end 300 are disposed adjacent one another. The first end 298 and the second end 300 may be affixed to one another at 302 in an embodiment, such as by resistance welding to name just one non-limiting embodiment. The seal sections 214, 218 are formed from material having substantially the same thickness in an embodiment. Although two seal sections 214, 218 are illustrated, any number of seal sections may be placed side-by-side to create a larger seal for applications requiring additional flexibility.

Figure 17:
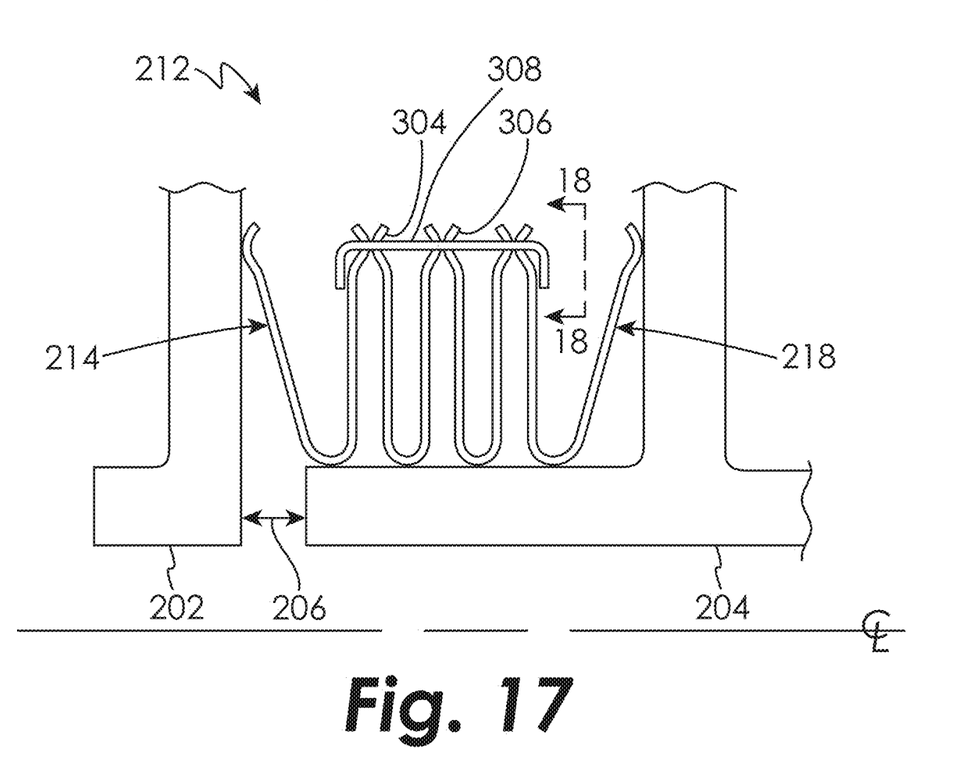
FIG. 17 is a schematic cross-sectional view of a seal and seal cavity in an embodiment.
Figure 18:
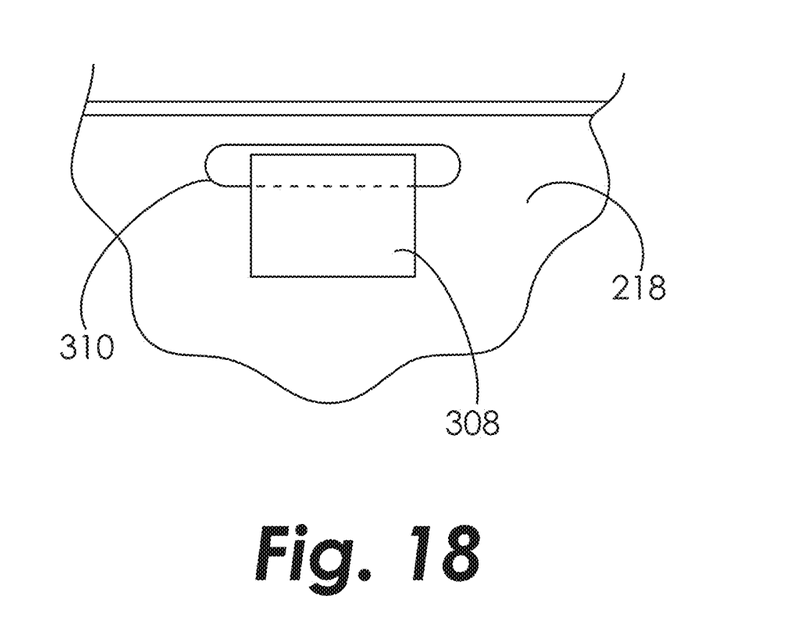
FIG. 18 is a schematic elevational view of a portion of the seal of FIG. 17 in an embodiment.

In the embodiment of FIG. 17, the seal 212 is substantially identical to the seal 212 shown in FIG. 16, except that the seal 212 may include additional seal sections. In the illustrated embodiment, two additional seal sections 304, 306, although a fewer or greater number of seal sections may be used. The seal sections 214, 218, 304 and 306 may be retained by a plurality of clips 308 spaced around the circumference of the outer diameter of the seal 212 in an embodiment. Each clip 308 may extend through a slot 310 in each of the seal sections 214, 218, 304 and 306. In an embodiment, the clip 308 may be formed from a piece of material having a first and second ends and a longitudinal axis extending therebetween, and each of the first and second ends of the clip 308 may be folded away from the longitudinal axis of the clip 308 to prevent the clip 308 from being removed from the slots 310. The seal sections 214, 218 are formed from material having substantially the same thickness in an embodiment. In another embodiment, the seal sections 214, 218 may be formed from a material having greater thickness than the seal sections 304, 306 to improve wear and thermal tolerance.

Unlike the seal 108, some or all portions the seal 212 can be made from a lower strength material that may be lower cost, have higher temperature capability, be more manufacturable, and/or more wear-resistant. The seal 212 may be used within a smaller design space than the w-seal 108. The seal 212 potentially exhibits improved wear tolerance because thicker sheet stock may be used within a given design space. The seal 212 also exhibits improved vibration tolerance due to friction damping.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A seal for sealing a space defined by first and second adjacent components disposed about an axial centerline, the seal comprising:
    a first seal section including a first leg, a second leg, and at least one convolution between the first and second legs;
    a second seal section including a third leg, a fourth leg, and at least one convolution between the third and fourth legs;
    a third seal section including a fifth leg, a sixth leg, and at least one convolution between the fifth and sixth legs, the first seal section, the second seal section and the third seal section are coupled together;
    wherein the first seal section sealingly engages with the first component and the second seal section and the third seal section sealingly engages with the second component; and
    wherein a free end of the second leg and a free end of the fifth leg are curved toward each other.

2. The seal of claim 1, wherein:
    the second leg includes a first interlocking feature;
    the third leg includes a second interlocking feature;
    the fourth leg includes a third interlocking feature and the fifth leg includes a fourth interlocking feature;
    the first interlocking feature engages the second interlocking feature; and
    the third interlocking feature engages the fourth interlocking feature.

3. A seal for sealing a space defined by first and second adjacent components disposed about an axial centerline, the seal comprising:
    a first seal section including a first leg, a second leg, and at least one convolution between the first and second legs;
    a second seal section including a third leg, a fourth leg, and at least one convolution between the third and fourth legs; and
    a third seal section including a fifth leg, a sixth leg, and at least one convolution between the fifth and sixth legs;
    wherein the third leg is located between the first leg and the second leg and the second leg is in contact with the third leg and the fourth leg is located between the fifth leg and the sixth leg and the fourth leg is in contact with the fifth leg;
    wherein the first seal section sealingly engages with the first component and the third seal section sealingly engages with the second component; and
    wherein a free end of the third leg and a free end of the fourth leg are directed in radial directions towards the axial center line.

4. The seal as in claim 3, wherein a free end of the second leg and a free end of the fifth leg are curved toward each other.

5. The seal as in claim 3, wherein the at least one convolution between the first and second legs contacts a surface of the second adjacent component, the at least one convolution between the third and fourth legs contacts a surface of the second adjacent component, and the at least one convolution between the fifth and sixth legs contacts the surface of the second adjacent component.

6. The seal as in claim 5, wherein the at least one convolution of the second seal section defines a radial positioning between the first seal section and the second seal section.

7. The seal as in claim 3, wherein the at least one convolution of the second seal section defines a radial positioning between the first seal section and the second seal section.

8. The seal as in claim 6, wherein the first seal section, the second seal section and the third seal section are formed from a material having substantially the same thickness.

9. The seal as in claim 3, wherein the first seal section, the second seal section and the third seal section are formed from a material having substantially the same thickness.

10. The seal of claim 8, wherein the first, second and third seal sections are formed from a high-temperature ceramic material.

11. The seal of claim 3, wherein the first, second and third seal sections are formed from a high-temperature ceramic material.

12. The seal of claim 10, wherein the first seal section includes a protrusion at the first leg and the third seal section includes a protrusion at the sixth leg.

13. The seal of claim 3, wherein the first seal section includes a protrusion at the first leg and the third seal section includes a protrusion at the sixth leg.

14. The seal of claim 12, wherein the protrusion at the first leg is located at an end of the first leg and the protrusion at the sixth leg is located at an end of the sixth leg.

15. The seal of claim 3, wherein the first seal section includes a protrusion at the first leg that contacts a surface of the first adjacent component along a substantially circumferential line of contact and the third seal section includes a protrusion at the sixth leg that contacts a surface of the second adjacent component along a substantially circumferential line of contact.

16. The seal of claim 14, wherein the at least one convolution of the second seal section extends past ends of the third and fourth legs and the protrusion at the first leg contacts a surface of the first adjacent component along a substantially circumferential line of contact and the protrusion at the sixth leg contacts a surface of the second adjacent component along a substantially circumferential line of contact.

17. A seal for sealing a space defined by first and second adjacent components disposed about an axial centerline, the seal comprising:
- a first seal section including a first leg, a second leg, and at least one convolution between the first and second legs;
- a second seal section including a third leg, a fourth leg, and at least one convolution between the third and fourth legs; and
- a third seal section including a fifth leg, a sixth leg, and at least one convolution between the fifth and sixth legs;
- wherein a distal end of the third leg is located between the first leg and the second leg and the second leg is in contact with the third leg and a distal end of the fourth leg is located between the fifth leg and the sixth leg and the fourth leg is in contact with the fifth leg;
- wherein the first seal section sealingly engages with the first component and the third seal section sealingly engages with the second component, wherein the at least one convolution between the first and second legs contacts a surface of the second adjacent component, the at least one convolution between the third and fourth legs contacts the surface of the second adjacent component, and the at least one convolution between the fifth and sixth legs contacts the surface of the second adjacent component.

18. A seal for sealing a space defined by first and second adjacent components disposed about an axial centerline, the seal comprising:
- a first seal section including a first leg, a second leg, and at least one convolution between the first and second legs;
- a second seal section including a third leg, a fourth leg, and at least one convolution between the third and fourth legs; and
- a third seal section including a fifth leg, a sixth leg, and at least one convolution between the fifth and sixth legs;
- wherein the third leg is located between the first leg and the second leg and the second leg is in contact with the third leg and the fourth leg is located between the fifth leg and the sixth leg and the fourth leg is in contact with the fifth leg;
- wherein the first seal section sealingly engages with the first component and the third seal section sealingly engages with the second component, wherein the at least one convolution of the second seal section extends past ends of the third and fourth legs.

* * * * *